Patented Nov. 2, 1937

2,097,687

UNITED STATES PATENT OFFICE 2,097,687

SURFACE ANESTHETIC

David Curtis, New York, N. Y.

No Drawing. Application September 24, 1935, Serial No. 41,872

4 Claims. (Cl. 167—52)

The present invention relates to solutions of anesthetics, particularly benzocaine, in emollient vehicles, such as glycerine or castor oil or the like, and it has for its object to provide anesthetic solutions of the character described which may be prepared in concentrated or dilute form, which are non-irritating to mucous tissues, and which will remain in stable solution for a sufficient length of time to make them commercially practicable.

It is also an object of the present invention to provide anesthetic solutions of the character described which are highly effective, rapid in action and which act as an anodyne as well as an anesthetic.

It is also the object of the present invention to provide a ready prepared basic substance for such anesthetic solutions which contain in chemical union benzocaine and aspirin and forms highly potent anodynic and anesthetic substances.

Benzocaine, which is also known as "ethyl-p-amino benzoate" ($C_6H_4.NH_2.COO.C_2H_5$), and which is a highly desirable anesthetic for surface anesthesia because of its ready availability, non-toxicity and effectiveness, is not soluble in glycerine, separating out therefrom in a short time. Even the addition of alcohol in such quantities as will not disturb the emollient and non-irritating characteristics of the final product, will not prevent the precipitation of benzocaine from glycerine.

I have found that the benzocaine will remain in stable solution in glycerine containing a relatively small proportion of alcohol, upon the addition of aspirin in approximately even amounts with the benzocaine. Thus when benzocaine is added to a mixture of four parts of glycerine to one of alcohol, by volume, the benzocaine will dissolve upon heating, but will precipitate in a short time. However, when both the benzocaine and aspirin in the proper proportions are present in the mixture of liquids, both of them will dissolve upon the application of heat and will remain in solution for a substantially long period of time, sufficiently long to make it practicable to prepare them as stock solutions for commercial purposes. Both of these substances will dissolve and remain in solution although aspirin alone will also precipitate out from such a mixture if the benzocaine is not present.

The foregoing, as well as many other tests which I performed with various proportions of the solvent liquids as well as of the ingredients, indicates that benzocaine and aspirin are interdependent for their mutual solubility in the solvents employed.

Not only do the benzocaine and aspirin act upon one another to facilitate their solubility in the above solvent mixtures, but I have found that they form a more potent and intense anesthetic preparation than a benzocaine solution of similar concentration of benzocaine, and in addition the anodynic effect of aspirin is preserved.

The solution of benzocaine and aspirin in a glycerine alcohol vehicle may be prepared in one of several ways. Both of the ingredients may be dissolved in hot glycerine and the requisite amount of alcohol added, and stirred; or the ingredients may be dissolved in the alcohol and the solution added to the glycerine previously heated up or to cold glycerine and heat then applied to effect solution. The ingredients may also be dissolved in a prepared proper mixture of the solvents and heat applied to effect solution.

While any suitable aliphatic alcohol may be used, such as ethyl, isopropyl or butyl, I prefer to use the aromatic alcohol, benzyl alcohol, also known as Phenmethylol—$C_6H_5.CH_2OH$, because of its own anesthetic properties which adds to the effectiveness of the final product. While varying proportions of benzocaine and aspirin may be used, it is preferable to use these ingredients in substantially equimolecular proportions, namely, 165.14 parts of benzocaine to 180.11 of aspirin. Thus, a preferred formula for a small quantity of the surface anesthetic solution of the present invention would be: 50 cc. of glycerine, 4.5 grams of aspirin, 4.125 grams of benzocaine and 12.5 cc. of benzyl alcohol.

The reason for the preference of using equimolecular proportions of benzocaine and aspirin is that these ingredients, when brought together in solution, form a new chemical substance (referred to in my circular "Anestozal" copyright May 29, 1934, Reg. No. 14,710), and which I call "aspircaine", known as ethyl-p-amino benzoyl-acetyl salicylate $(C_6H_4.NH_2COO.C_2H_5).C_6H_4O.(CH_3CO).COOH.$ Aspircaine may be formed by melting equimolecular quantities of benzocaine and aspirin together, forming, upon solidification a white crystalline substance of a low melting point. It may also be formed by dissolving equimolecular weights of the constituents in a volatile solvent, such as acetone, and crystallizing therefrom. Melting point of the substance thus obtained is 70–72° C.

The aspircaine powder, which is extremely potent in its action is also soluble in the mixture of glycerine and alcohol described above, and may be used to form the emollient surface anesthetic solution of the present invention by directly dissolving it in the solvent mixture.

Benzocaine and aspirin, or aspircaine also dissolve in castor oil, olive oil or other vegetable oil, with or without the addition of alcohol, though aspirin by itself does not form a stable solution in castor oil. They form, in castor oil, an emollient anesthetic solution having properties which make it suitable for certain uses because of its milder action and greater emolliency.

It may here be stated that all of the isomeric forms of ethyl-amino benzoate may be used in the same manner as the para form. And it may here be stated that in the preparation of the pure aspircaine salts, as well as in the preparation of the emollient solutions containing the same, it is not absolutely necessary to use exact molecular proportions of the reactants. A moderate excess of aspirin will in no way be detrimental to the preparation of the salt or its emollient solution. Similarly, a moderate excess of the anesthetic ingredient will also be harmless, provided the excess is not sufficient to affect the solubility of the ingredients in the particular quantity of the particular solvent used. The excess of the anesthetic base may possibly combine with some of the acetyl group of the aspirin to form a saturated compound or a di-benzocaine salt of the acetyl salicylic acid.

The anesthetic solutions of the present invention, because of the emollient nature of the base solvent, which makes them non-irritating, and because of their high potency are especially suitable for use on mucous tissues to minimize the discomfort due to needle insertion, in tonsil coagulation work and for controlling post operative pain in minor surgery, where the solution may be used as a dressing on gauze or like material; for application to the skin to relieve pain due to minor abrasions, irritations, insect bites and the like.

Where glycerine is used as the emollient solvent, the solution is adapted, due to its miscibility with water, to be diluted with water for use as a mouth wash, nose or throat gargle or spray, to relieve any irritation in the nose or throat. A teaspoonful or two of the solution given as an example above, to a glass of water, gives the desirable concentration for the purpose. Suitable carminative substances such as menthol, saccharine, essential oils or other substances customarily used in pharmaceutical practice may be added to the stock solution to give it a pleasant taste or flavor. Similarly, decongestive substances such as ephedrine, epinephrine and the like, may be added to the stock solution in the proper quantities when necessary to relieve congestion in the nasal passages or for similar purposes.

Repeated use of the surface anesthetic solution of the present invention has shown that the active ingredient, aspircaine, combines, for the above purposes, the therapeutic value of aspirin with the induction of a mild surface anesthetic effect, altogether beneficial and agreeable to the user.

This completes the description of the anesthetic substances and solutions of the present invention. It may here be stated that the proportions herein suggested are given merely as preferred examples. It is to be understood that many variations in such proportions may be made without detracting from the value or effectiveness of the resulting product and which will be within the spirit and scope of the present invention.

What I claim as my invention is:

1. As a new compound, the acetyl salicylic acid salt of ethyl aminobenzoate, having the formula of $C_6H_4.NH_2COO.C_2H_5$—$C_6H_4O(CH_3CO).COOH$.

2. As a new compound, the acetyl salicylic acid salt of ethyl-para-amino benzoate.

3. The method for preparing a solution of ethyl-p-amino-benzoyl-acetyl-salicylate which comprises the steps of dissolving substantially equimolecular proportions of ethyl-p-amino-benzoate and acetyl-salicylic acid in a solvent comprising a mixture of an alcohol and an emollient substance of the group of glycerine and vegetable oils.

4. The method for preparing a solution of ethyl-p-amino-benzoyl-acetyl-salicylate which comprises the steps of dissolving substantially equimolecular proportions of ethyl-p-amino-benzoate and acetyl-salicylic acid in a solvent comprising an emollient substance from the group of vegetable oils.

DAVID CURTIS.